United States Patent
Chapman et al.

(10) Patent No.: US 9,692,564 B2
(45) Date of Patent: Jun. 27, 2017

(54) DOWNSTREAM EXTERNAL PHYSICAL INTERFACE TRANSPORT IN DOCSIS 3.1 NETWORK ENVIRONMENTS

(71) Applicant: CISCO TECHNOLOGY, INC., San Jose, CA (US)

(72) Inventors: John T. Chapman, Laguna Niguel, CA (US); Jiening Ao, Suwanee, GA (US); Brian Patrick Bresnahan, Bedford, NH (US); Pawel Piotr Sowinski, Sudbury, MA (US); Lin Su, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 129 days.

(21) Appl. No.: 14/685,452

(22) Filed: Apr. 13, 2015

(65) Prior Publication Data
US 2015/0295746 A1  Oct. 15, 2015

Related U.S. Application Data

(60) Provisional application No. 61/979,325, filed on Apr. 14, 2014.

(51) Int. Cl.
*H04L 12/28* (2006.01)
*H04L 12/56* (2006.01)
(Continued)

(52) U.S. Cl.
CPC ........... *H04L 5/0007* (2013.01); *H04B 3/542* (2013.01); *H04J 3/0667* (2013.01); *H04J 3/0673* (2013.01);
(Continued)

(58) Field of Classification Search
CPC .. H04L 5/0007; H04L 12/2801; H04L 27/345; H04L 47/12; H04L 27/3405; H04L 27/2697; H04L 5/006; H04L 47/27; H04J 3/0667; H04J 3/0673; H04B 3/542
USPC .......................................... 370/390, 392, 419
See application file for complete search history.

(56) References Cited

U.S. PATENT DOCUMENTS

2008/0159140 A1 *  7/2008  Robinson ............ H04L 12/2801
                                                   370/232
2009/0285233 A1 * 11/2009  Al-Banna ............ H04L 12/2881
                                                   370/419
(Continued)

OTHER PUBLICATIONS

U.S. Appl. No. 61/934,419, filed Jan. 31, 2014.*
(Continued)

*Primary Examiner* — Chuong T Ho
(74) *Attorney, Agent, or Firm* — Patent Capital Group

(57) ABSTRACT

An example method for Downstream External Physical Interface (DEPI) in Data Over Cable Service Interface Specification (DOCSIS) 3.1 network environments is provided and includes generating, at a Converged Cable Access Platform (CCAP) core, a DEPI-Packet Streaming Protocol (PSP) pseudo-wire (PW) packet including a PSP sub-layer header having a same length for a Quadrature Amplitude Modulation (QAM) channel and an Orthogonal Frequency-Division Multiplexing (OFDM) channel in the DOCSIS network environment, and transmitting the DEPI-PSP PW packet over a DEPI interface to a remote physical layer (R-PHY) entity.

14 Claims, 5 Drawing Sheets

(51) Int. Cl.
*H04L 5/00* (2006.01)
*H04L 27/34* (2006.01)
*H04B 3/54* (2006.01)
*H04L 27/26* (2006.01)
*H04L 12/801* (2013.01)
*H04L 12/807* (2013.01)
*H04J 3/06* (2006.01)

(52) U.S. Cl.
CPC .......... *H04L 5/006* (2013.01); *H04L 12/2801* (2013.01); *H04L 27/2697* (2013.01); *H04L 27/3405* (2013.01); *H04L 27/345* (2013.01); *H04L 47/12* (2013.01); *H04L 47/27* (2013.01)

(56) References Cited

U.S. PATENT DOCUMENTS

2009/0310480 A1* 12/2009 Bao .................... H04L 12/2801 370/217
2013/0070765 A1* 3/2013 Chapman ............ H04L 12/2801 370/390
2015/0222449 A1* 8/2015 Salinger .............. H04L 12/2801 370/419
2015/0295669 A1 10/2015 Chapman et al.
2015/0295684 A1 10/2015 Jin et al.
2015/0295838 A1 10/2015 Liu et al.

OTHER PUBLICATIONS

Chapman, John T., "The Power of DOCSIS 3.1 Downstream Profiles," NCTA Technical Paper, 2013 Spring Technical Forum, Jun. 10-12, 2013, Washington, DC; 16 pages http://www.nctatechnicalpapers.com/Paper/2013.

CableLabs, Downstream External PHY Interface Specification (Jun. 11, 2010), available at http://www.cablelabs.com/wp-content/uploads/specdocs/CM-SP-DEPI-I08-100611.pdf.

* cited by examiner

DOWNSTREAM EXTERNAL PHYSICAL INTERFACE TRANSPORT IN DOCSIS 3.1 NETWORK ENVIRONMENTS

CROSS-REFERENCE TO RELATED APPLICATION

This application claims the benefit of priority under 35 U.S.C. §119(e) to U.S. Provisional Application Ser. No. 61/979,325 entitled "REMOTE PHY ARCHITECTURE," filed Apr. 14, 2014, which is hereby incorporated by reference in its entirety.

TECHNICAL FIELD

This disclosure relates in general to the field of communications and, more particularly, to Downstream External Physical Interface (DEPI) in Data Over Cable Service Interface Specification (DOCSIS) 3.1 network environments.

BACKGROUND

Driven by market evolution towards triple-play services, cable operators in emerging markets are seeking standardized and digital fiber-based solutions for economical and future proof access technologies. Much of the demand is driven by the need to provide higher bandwidth packet transport for Internet connectivity, video and voice services. DOCSIS is an international telecommunications standard that has evolved to permit addition of high-bandwidth data transfer to an existing cable TV (CATV) system utilizing Quadrature Amplitude Modulation (QAM) and/or Quadrature phase-shift keying (QPSK) Radio Frequency (RF) modulation. It is employed by many cable television operators to provide Internet access over their existing hybrid fiber-coaxial (HFC) infrastructure. Traditionally, the DOCSIS system is a Point-to-Multipoint communications system, the corresponding standards defining Media Access Control (MAC)/PHY standards associated with providing high speed data over a hybrid fiber coaxial (HFC) network and is not naturally applicable for digital fiber. However, Cisco® remote-PHY (R-PHY) technology bridges the gap, for example, by allowing the optical part of the HFC plant to be digital as well as to separate the PHY components from the CCAP and locate them at the edge of the fiber plant.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for Downstream External Physical Interface (DEPI) in DOCSIS 3.1 network environments is provided and includes generating, at a Converged Cable Access Platform (CCAP) core, a DEPI-Packet Streaming Protocol (PSP) pseudo-wire (PW) packet including a PSP sub-layer header having a same length (e.g., number of bits) for a Quadrature Amplitude Modulation (QAM) channel and an Orthogonal Frequency-Division Multiplexing (OFDM) channel in the DOCSIS network environment, and transmitting the DEPI-PSP PW packet over a DEPI interface to a remote physical layer (R-PHY) entity.

As used herein, the term "packet" refers to a unit of data forwarded between an origin and a destination in a network. Each packet typically includes a payload (e.g., carrying information) and headers (e.g., carrying meta-data) that can include various layers (e.g., sub-layer headers) of meta-data. In a general sense, a "channel" refers to an information transfer path within a system (e.g., DOCSIS networks), and the mechanism by which the path is created. QAM channel refers to an analog radio frequency channel that uses QAM (e.g., a modulation technique in which an analog signal's amplitude and phase vary to convey information, such as digital data) to convey information. QAM channel can include single carrier QAM (SC-QAM) or legacy DOCSIS 3.0 channel. OFDM refers to an orthogonal frequency-division multiplexing (FDM) scheme used in a digital multi-carrier modulation method introduced in DOCSIS 3.1.

Example Embodiments

Figure 1:
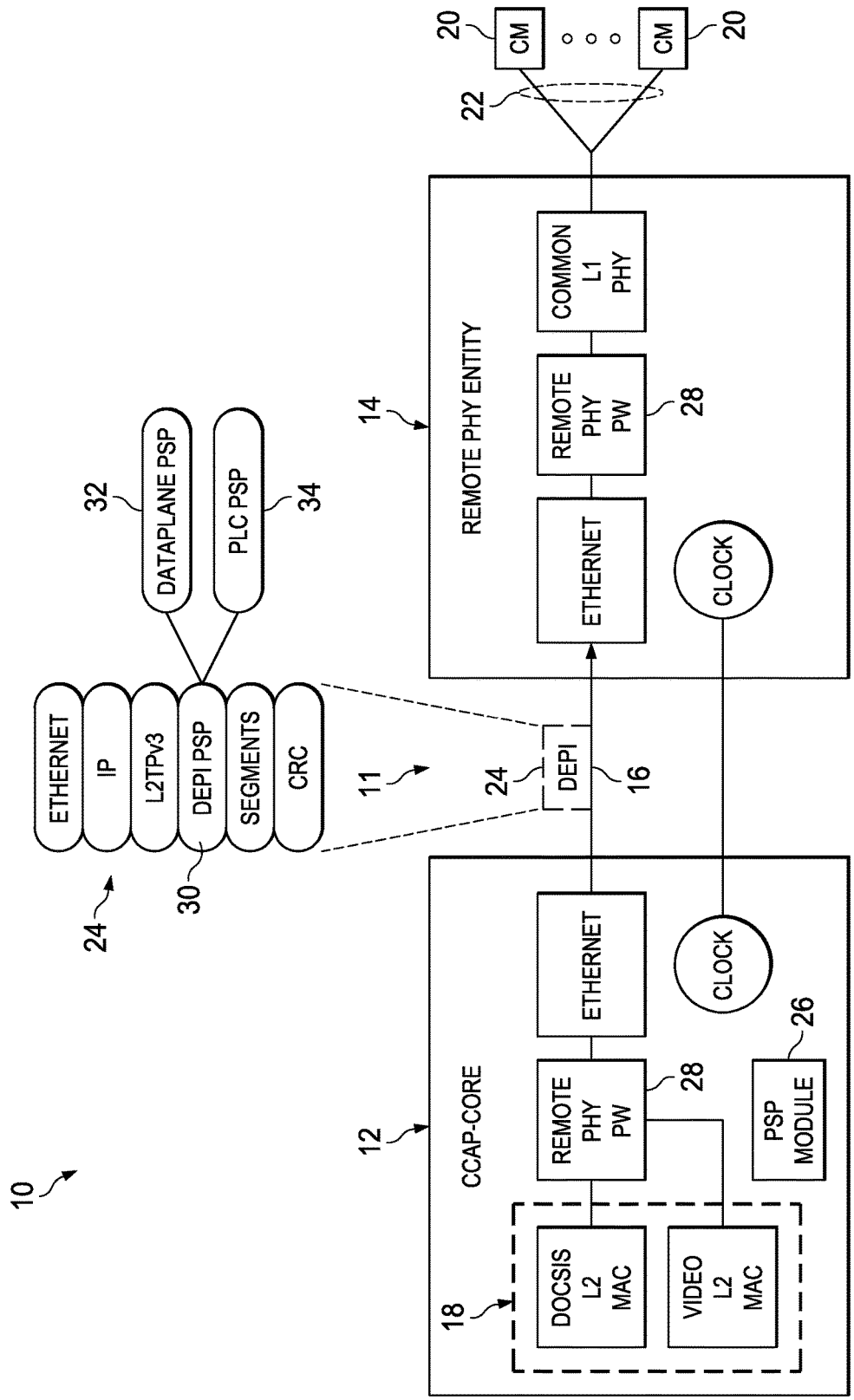
FIG. 1 is a simplified block diagram illustrating a communication system for DEPI in DOCSIS 3.1 network environments.

Turning to FIG. 1, FIG. 1 is a simplified block diagram illustrating a communication system 10 for DEPI in DOCSIS 3.1 network environments in accordance with one example embodiment. FIG. 1 illustrates a network 11 (indicated generally by an arrow) facilitating communication between a Converged Cable Access Platform (CCAP) Core 12 and an R-PHY entity 14, connected via DEPI 16. CCAP Core 12 and R-PHY entity 14 together comprise a CCAP, which is a combination of a DOCSIS cable modem termination system (CMTS) and an edge QAM (EQAM). Media Access Control (MAC) and higher-layer functions of the CMTS are located in CCAP Core 12, for example, in MAC 18, comprising DOCSIS L2 MAC and Video L2 MAC. MAC 18 includes signaling functions, downstream bandwidth scheduling and DOCSIS framing. R-PHY entity 14 includes QAM modulators to connect to one or more cable modems (CMs) 20 over a hybrid fiber-coaxial (HFC) network 22 and tunneling logic to connect CCAP Core 12 over DEPI 16.

DEPI 16 comprises physical and logical arrangements supporting an Internet Protocol (IP) tunnel between MAC 18 and R-PHY entity 14 including data path for DOCSIS frames and control path for setting up, maintaining, and tearing down sessions. DEPI 16 transports DOCSIS frames or video frames (e.g., Moving Picture Experts Group (MPEG) frames) as formatted DEPI pseudo-wire (PW) packet 24 through a Layer 2 or Layer 3 network from CCAP Core 12 to R-PHY entity 14. In a general sense, a PW is a mechanism to transparently transport a layer 2 protocol over a layer 3 network. In various embodiments, a Packet Streaming Protocol (PSP) module 26 at CCAP Core 12 generates DEPI-PSP PW packet 24. In a general sense, PSP encapsulates a continuous stream of DOCSIS frames into a DEPI payload. PSP allows DOCSIS frames to be both concatenated, to increase network performance, and fragmented, in case the tunneled packets exceed the network maximum transmission unit (MTU) size.

DEPI 16 uses a base protocol comprising Layer 2 Tunneling Protocol Version 3 (L2TPv3) for creating DEPI-PSP PW packet 24. Examples of protocols supported by L2TPv3 include Asynchronous Transfer Mode (ATM), High-level Data Link Control (HDLC), Ethernet, Frame Relay, Point-to-Point Protocol (PPP), etc. In various embodiments, a Remote PHY PW 28 facilitates setting up the PW channel (e.g., path) between CCAP Core 12 and R-PHY entity 14 over DEPI 16.

DEPI 16 includes a set of interfaces, one of which is DOCSIS PSP, which is used to carry DOCSIS data and Media Access Protocol (MAP) messages in separate flows. DOCSIS 3.1 specifications builds upon previous generations of DOCSIS specifications (commonly referred to as the DOCSIS 3.0 and earlier specifications), leveraging existing MAC and PHY networking layers, and adding a new PHY layer designed to improve spectral efficiency and provide better scaling for larger bandwidths. The new PHY layer facilitates flexibility to deploy the technology in any suitable cable spectrum plan, allowing for global interoperability. The DOCSIS 3.1 PHY layer provides for various features associated with communication over HFC network 22 between R-PHY entity 14 and CMs 20.

DOCSIS 3.1 provides for different downstream traffic profiles, which allow specific traffic flows to be discriminated for Quality Of Service (QOS) treatment at CCAP Core 12 and R-PHY entity 14. In a general sense, the profile can describe modulation per subcarrier over HFC network 22 (e.g., bit loading for each subcarrier). The profile includes dynamic configuration values for an Orthogonal Frequency-Division Multiplexing (OFDM) channel; the configuration values include modulation levels for each subcarrier. The multi-profile system of DOCSIS 3.1 enables providing a best overall service to all CMs 20. Each one of CMs 20 can be a member of more than one profile (e.g., profile A for data, profile B for video, etc.). From a packet forwarding perspective, each profile creates a unique path through an OFDM channel from R-PHY entity 14 to CMs 20. Thus, profiles and paths may be used interchangeably herein. Although DOCSIS 3.1 specifications provide for multiple profiles in HFC network 22, the information associated with the profiles is not captured in the corresponding DEPI specification for communication between CCAP Core 12 and R-PHY entity 14.

The original DEPI specification (2005) specified two data packet transport methods and encapsulation formats capable of transferring packets for SC-QAM (pre-DOCSIS 3.0) downstream channels. DOCSIS 3.1 introduced the concepts of OFDM profiles and a PHY Link Channel (PLC) signaling sub-channel. Both those concepts require changes to the previously defined DEPI transport methods and encapsulation formats. Further, R-PHY technology imposes higher scaling requirements, for example, on CCAP Core 12 to handle 10s of thousands of DEPI PWs. To address the scaling issue, embodiments of communication system 10 provide for a DEPI packet format enabling transport of data intended for multiple downstream (DS) channels over a single PW.

According to various embodiments, the DOCSIS 3.1 DEPI-PSP format is modified to enable transport of features provided in DOCSIS 3.1 between CCAP Core 12 and R-PHY entity 14. Embodiments of communication system 10 provide for transmission of DOCSIS packets across DEPI 16 as DEPI-PSP PW PACKET 24 using different PW encapsulation formats. For example, DEPI-PSP PW PACKET 24 may be formatted with various headers (e.g., Ethernet, IP, L2TPv3, DEPI PSP, Segments, CRC) representing different protocols. According to some embodiments, a PSP sub-layer header 30 (DEPI PSP) in DEPI-PSP PW packet 24 may be generated in a format according to a unified Data Plane PSP [encapsulation] 32. According to other embodiments, PSP sub-layer header 30 may be formatted according to a unified PLC PSP [encapsulation] 34. In various embodiments, PSP sub-layer header 30 may have the same length (e.g., 32 bits) for both QAM channel and OFDM channel (compared to 16 bit QAM channel according to prevailing DEPI specifications).

Data Plane PSP 32 can be utilized to carry DOCSIS packets for OFDM and SC-QAM channel types specified in DOCSIS 3.1 specification. Data Plane PSP 32 allows a single PW to carry packets for multiple channels, multiple channel types and multiple OFDM profiles. Compared to the PSP format previously specified in the DEPI specification, Data Plane PSP 32 includes the following modifications: each entry of a segment table is 32-bits long (versus 16-bit in the previous DEPI specification); 8 bits of the reserved field are used to indicate a channel identifier (ID), which can indicate either OFDM channel or SC-QAM channel; and up to 255 channels can be carried in a single session. To support QAM replication (e.g., RF spanning, which allows users to replicate a single QAM output from one port to another port), in certain embodiments, the channel ID may represent more than one physical channel. A mapping between the channel IDs and R-PHY entity 14's channel resources may be communicated via suitable R-PHY control plane protocols (e.g., Generic Control Plane Protocol (GCP)).

Furthermore, packets intended for OFDM channels with different profiles can include, in Data Plane PSP 32, an identifier of the OFDM profile on which the packet is to be transmitted over HFC network 22 by R-PHY entity 14. In an example embodiment, a value of "0000" for the profile ID indicates profile A. Profile ID may be optional for SC-QAM channels (which may not support multiple profiles in HFC network 22), in which case, a default profile ID of "0000" may be used, which may be ignored by R-PHY entity 14. Additionally, a 4-bit sequence number is used in Data Plane PSP 32 to track segments for a particular channel and a particular profile.

The PLC comprises a set of contiguous OFDM subcarriers (e.g., eight for 4K FFT and 16 for 8K FFT according to DOCSIS 3.1 specifications), constituting a sub-channel of the OFDM channel, which conveys physical layer parameters (e.g., timestamp; energy management; message channel for bringing new CMs 20 on line; trigger message for synchronizing an event between CCAP Core 12 and CMs 20; etc.) from R-PHY entity 14 to CMs 20. The physical layer parameters may be conveyed from CCAP Core 12 to R-PHY entity 14 over DEPI 16 using PLC PSP 34 format for DEPI-PSP PW PACKET 24.

PLC PSP 34 format supports transport of DOCSIS Protocol Data Units (PDUs) for transmission on a message channel of the PLC. Additional modifications allow for transport and scheduling of PLC Message Blocks (MBs). In an example embodiment, PSP sub-layer header 30 includes a segment type bit (T bit) that allows differentiation of segments carrying DOCSIS PDU fragments from segments carrying PLC Message Blocks. PLC PSP 34 includes the "T" bit in place of the profile ID. When the "T" bit is set to '1', the segment carries a PLC Message Block. T bit value of 0 indicates a MAC management message (MMM) (e.g., DOCSIS Protocol Data Unit (PDU)).

In various embodiments, B and E bits of PSP sub-layer header 30 are interpreted differently from previous DOCSIS specifications. In previous DOCSIS specifications, the B bit and E bit signified the beginning and end, respectively, of a DOCSIS frame. B was set to 1 to indicate that the PSP frame contains the beginning of the DOCSIS frame; otherwise it was set to 0; likewise, E was set to 1 to indicate that the PSP Frame contains the end of a DOCSIS frame; otherwise it was set to 0. In contrast, in example embodiments, the presence of an optional 32 bit timestamp is indicated when both the T bit is set to '1' and the "B" is set to '1'. Any of the transported PLC Message Blocks can be preceded by the timestamp. The inclusion of the timestamp permits CCAP Core 12 to send PLC Message Blocks that have real time dependencies within HFC network 22 to be transmitted over DEPI independently (ahead) of their ideal (e.g., desired, expected, etc.) transmission time within HFC network 22 thus removing real-time requirement from the DEPI transport.

Further, transport mechanisms with the embedded timestamp according to embodiments of communication system 10 allows for scheduling of transmission time of PLC Message Blocks on the downstream wire independently from the time the PLC Message Blocks are transferred across DEPI 16, removing difficult real-time requirements from DEPI transport for DOCSIS 3.1. For example, an effective time window for scheduling Energy Management Message Blocks (EM MBs) can be equal to time duration of two PLC frames. Depending on OFDM channel parameters, the time window may extend anywhere from 5.3 msec to 10.5 msec. Without the embedded timestamp, CCAP Core 12 would have to deliver EM MBs via DEPI 16 and R-PHY entity 15 would have to transmit the EM MBs with sufficient precision to fit into the expected time window of 5.3 msec to 10.5 msec. With a network jitter of up to 8 msec (according to R-PHY specifications), it may not be possible to transmit within the time window precisely. With the embedded timestamp, CCAP Core 12 can send the EM MB tens of milliseconds ahead of the scheduled downstream transmission time and overcome any imprecision imposed by network jitter.

The transport mechanism according to various embodiments uses a unified format of PSP sub-layer header 30 for QAM (e.g., Single Carrier QAM (SC-QAM)) and OFDM channels, including OFDM PLC sub-channel, allowing a single PW to carry data for both types of channels. The transport mechanism permits association of OFDM profile information with DOCSIS packets transferred across DEPI 16, facilitating implementation of DEPI transport for DOCSIS 3.1 OFDM channels. Further, the implementation of the packet encapsulation may be simplified by reusing the same or similar circuitry in DEPI transmitter and receiver to process packets or segments intended for both types of downstream channels.

Data Plane PSP 32 and PLC PSP 34 permit transmission of data intended for multiple channels (e.g., up to 255 in some embodiments) over a single PW. By allowing multiple channels within one PW, better protocol and product scaling can be achieved. Instead of handling tens of thousands of sessions, with multiple channels per session, CCAP Core 12 may handle only a few sessions, with multiple channels each, reducing scaling requirements by an order of magnitude. In other words, CCAP Core 12 can support larger number of channels and more effectively manage them. Additional benefits include bandwidth savings as multichannel transport permits formation of larger average frame size with lower encapsulation overhead.

Turning to the infrastructure of communication system 10, the network topology can include any number of cable modems, customer premises equipment, servers, switches (including distributed virtual switches), routers, and other nodes inter-connected to form a large and complex network. Network 11 represents a series of points or nodes of interconnected communication paths for receiving and transmitting packets and/or frames of information that are delivered to communication system 10. A node may be any electronic device, computer, printer, hard disk drive, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Network 11 offers a communicative interface between cable modem network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 11 may implement any suitable communication protocol for transmitting and receiving data packets within communication system 10. The architecture of the present disclosure may include a configuration capable of TCP/IP, TDMA, and/or other communications for the electronic transmission or reception information in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In particular embodiments, CCAP Core 12 may comprise a hardware appliance with appropriate ports, processors, memory elements, interfaces, and other electrical and electronic components that facilitate the functions described herein. In some embodiments, PSP module 26 may comprise a hardware device or software application or combination thereof executing within CCAP Core 12 to perform the operations described herein. In other embodiments, PSP module 26 may comprise a hardware device or software application executing outside CCAP Core 12, for example, in a separate appliance, server, or other network element and coupled (e.g., connected to, in communication with, etc.) to CCAP Core 12 in network 11.

R-PHY entity 14 may comprise suitable hardware components and interfaces for facilitating the operations described herein. In some embodiments, R-PHY entity 14 may be embedded in or be part of another hardware component, such as a broadband processing engine (comprising a motherboard, microprocessors and other hardware components). In some embodiments, R-PHY entity 14 comprises downstream and upstream PHY, deployed in a Coaxial Media Converter (CMC) that supports RF functions at the PHY layer.

Note that is some embodiments, CCAP Core 12 and R-PHY entity 14 may be located in the same chassis; in other embodiments, CCAP Core 12 and R-PHY entity 14 may be located in different physical locations, remote from each other and coupled over a Layer 2 or Layer 3 network with various other network elements, such as switches and routers intervening there-between.

Figure 2:
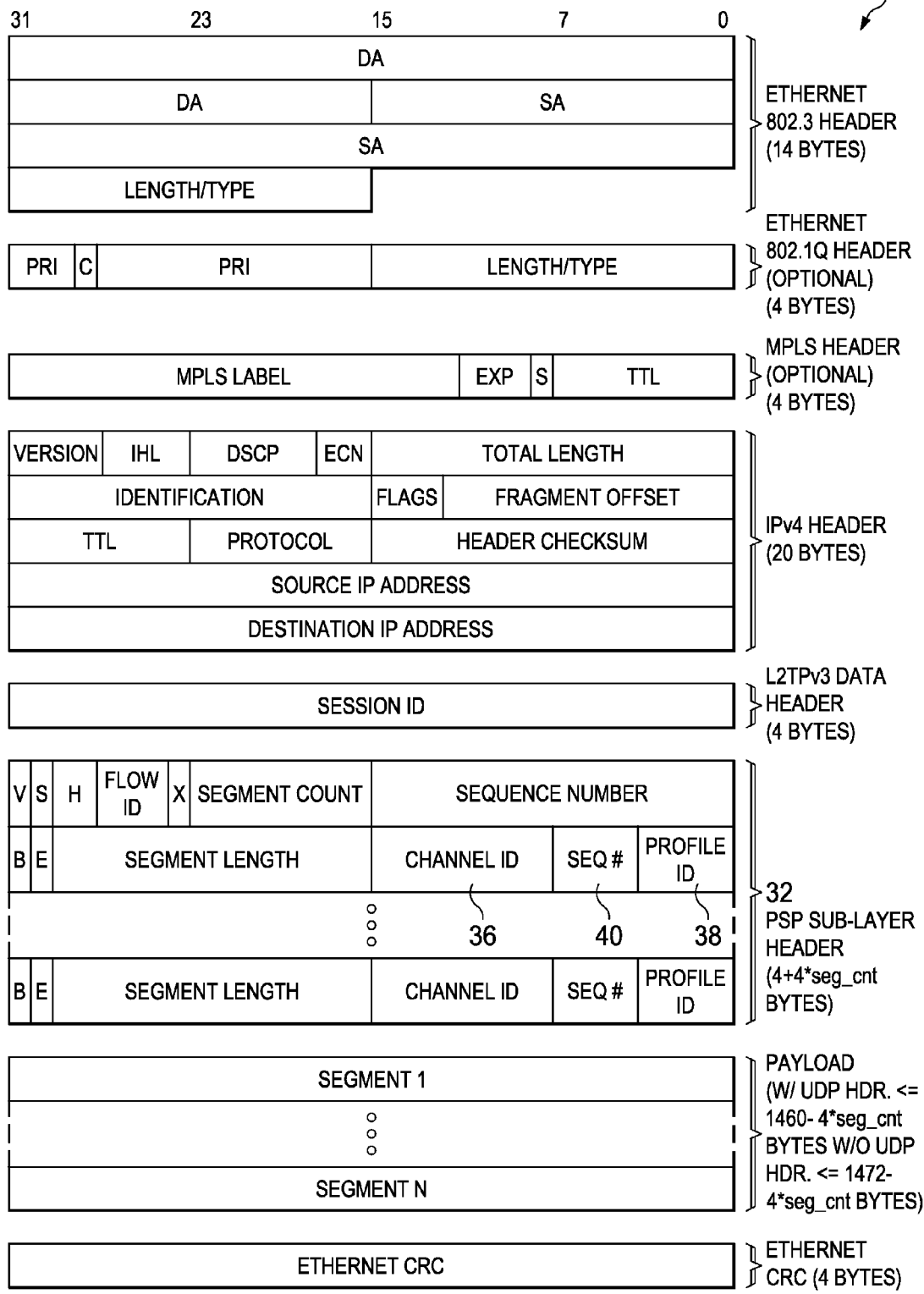
FIG. 2 is a simplified block diagram illustrating example details of embodiments of the communication system.

Turning to FIG. 2, FIG. 2 is a simplified block diagram showing example details of DEPI-PSP PW packet 24 according to an embodiment of communication system 10. In various embodiments, Data Plane PSP 32 comprises 4 bytes (32 bits) and includes a channel ID field 36 in various embodiments. In an example embodiment, channel ID field 36 comprises eight (8) bits permitting up to 255 channels to be indicated in a single session. In some embodiments, channel ID field 37 indicates OFDM channel. In other embodiments, channel ID field 37 indicates SC-QAM channel.

Data Plane PSP 32 includes a profile ID field 38 in various embodiments. Profile ID field can indicate a particular profile for OFDM channels. Profile ID field 38 is optional for SC-QAM channels. In some embodiments, a dummy value of "0000" may be assigned to profile ID field 38 by CCAP Core 12 for SC-QAM channels, and the dummy value may be ignored by R-PHY entity 14.

A sequence number field 40 tracks segments for a particular channel and a profile. In some embodiments, sequence number field 40 may comprise four (4) bits. In various embodiments, if R-PHY entity 14 detects lost segments (e.g., sequence number field 40 indicates sequences out of order), -PHY entity 14 may discard outstanding partially reassembled packets. In some embodiments, the legacy PSP format can be eliminated or made optional.

Figure 3:
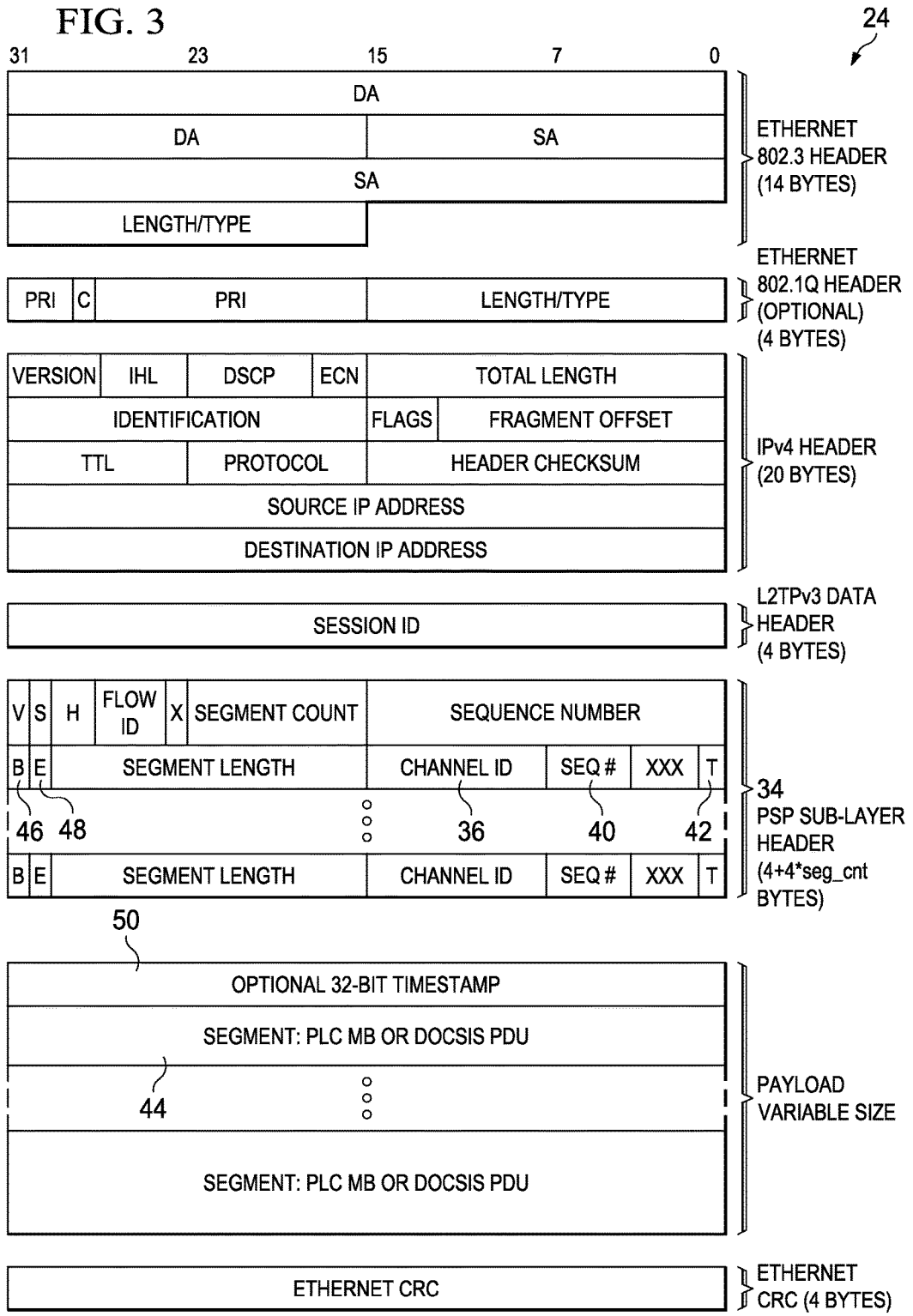
FIG. 3 is a simplified block diagram illustrating other example details of embodiments of the communication system.

Turning to FIG. 3, FIG. 3 is a simplified block diagram showing example details of DEPI-PSP PW packet 24 according to an embodiment of communication system 10. PLC PSP 34 includes, instead of profile ID field 38, a segment type "T" bit 42. PLC PSP 34 also includes channel ID field 36 and sequence number field 42. Segment type T bit 42 identifies a type of data in segment 44. For example, a value of 0 in segment type T bit 42 indicates a DOCSIS PDU (e.g., MMM) in segment 44; a value of 1 in segment type T bit 42 indicates a PLC Message Block in segment 44.

PLC PSP 34 also includes a B bit 46 and an E bit 48. If segment 44 is a PLC Message Block, E bit 48 may not be valid (in some embodiments) and may be transmitted as 0; whereas B bit 46 indicates the presence of a timestamp 50 (e.g., four bytes (32 bits) in some embodiments). Timestamp 50 may serve to identify the PLC frame and indicate a future time of transmission of the PLC Message Block.

Figure 4:
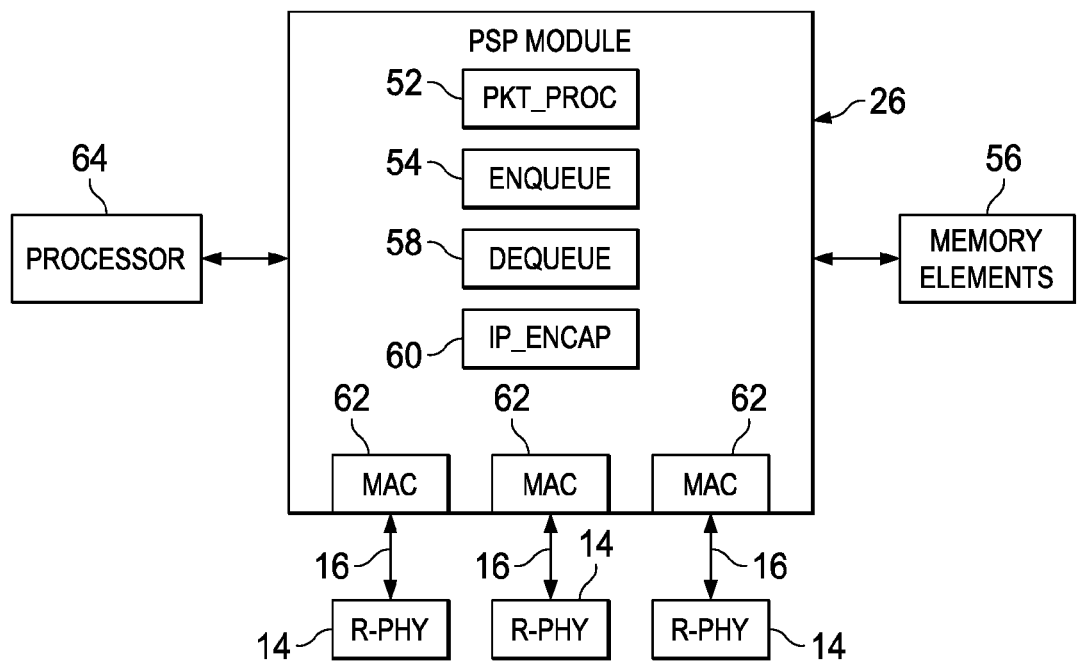
FIG. 4 is a simplified block diagram illustrating yet other example details of embodiments of the communication system.

Turning to FIG. 4, FIG. 4 is a simplified block diagram illustrating example details of PSP module 26 according to various embodiments of communication system 10. Note in various embodiments PSP module 26 may be implemented in hardware on an integrated circuit, such as field-programmable gate array (FPGA) or application specific integrated circuit (ASIC). PSP module 26 can comprise a packet processing module 52 (PKT_PROC) that performs DOCSIS and video (e.g., MPEG) header processing. For example, for DOCSIS processing, packet processing module 52 performs table lookups for service flow table, DOCSIS service ID (DSID), Baseline Privacy Interface (BPI) and statistics. PKT_PROC 52 may create and add DOCSIS headers (e.g., DOCSIS PDU header, MAC management header, etc.) if needed. For video packets, PKT_PROC 52 modifies various parameters in MPEG headers if needed and performs lookup for encryption keys.

An enqueue [module] 54 may be responsible for writing DOCSIS and video packets in per-channel queues in external memory, such as memory elements 56. Note that the term "channel" refers to a physical channel in HFC network 22, whereas the channel used in DEPI-PSP PW PACKET 24 refers to a number that maps to the physical channel (e.g., at R-PHY entity 14). Enqueue 54 may be responsible for MAP replication, load-balancing for bonded traffic and queue flow control. If the headers are not populated to begin with, software in enqueue 54 may configure queues and assign profiles to specific channels based on CCAP Core 12's assignment of profiles to specific CMs 20.

In one example embodiment, if a first OFDM channel is selected for a packet, the profile ID assigned is profile_id0; if a second OFDM channel is selected, the profile ID is profile_id1. Values of the profile ID may be populated in profile ID field 38 of data plane PSP 32 (for OFDM channels). Enqueue 54 may adjust queue lengths and perform other processing based on a value of the profile ID in profile ID field 38 of data plane PSP 32 (for OFDM channels). Enqueue 54 may also create queue data structures for use in a dequeue [module] 58. The queues may be further based on the channel number for DOCSIS packets (e.g., for QAM channels). Dequeue 58 may be responsible for reading DOCSIS and video packets out of memory elements 56.

An IP encapsulation [module] 60 (IP_ENCAP) receives packets from dequeue 58 and adds Ethernet/IP/L2TPv3/L2TPv3 sub-layer headers to the packets (among other functionalities). IP_ENCAP 60 also generates DEPI-PSP headers (e.g., data plane PSP 32, PLC PSP 34) on packets it receives from dequeuer 58. For example, for PLC packets comprising either a MAC Management Message (MMM) such as OFDM Channel Descriptor (OCD), Downstream Profile Descriptor (DPD), etc. or PLC Message Blocks (MBs) (e.g., timestamp MB, energy management MB, etc.), IP_ENCAP 60 may add appropriate PLC PSP 34 header values, including optional timestamp 50 to PLC MBs.

MAC modules 62 connect to R-PHY entity 14 over DEPI interfaces 16 and enclose corresponding output ports (which can comprise XFI ports in some embodiments). MAC modules 62 queue the encapsulated packets for outflow, and transmit them over DEPI 16 to corresponding R-PHY entities 14. Note that a line card processor, supervisor processor, or other processor 64 (e.g., executing within PSP module 26) can also be used for various operations described herein.

Figure 5:
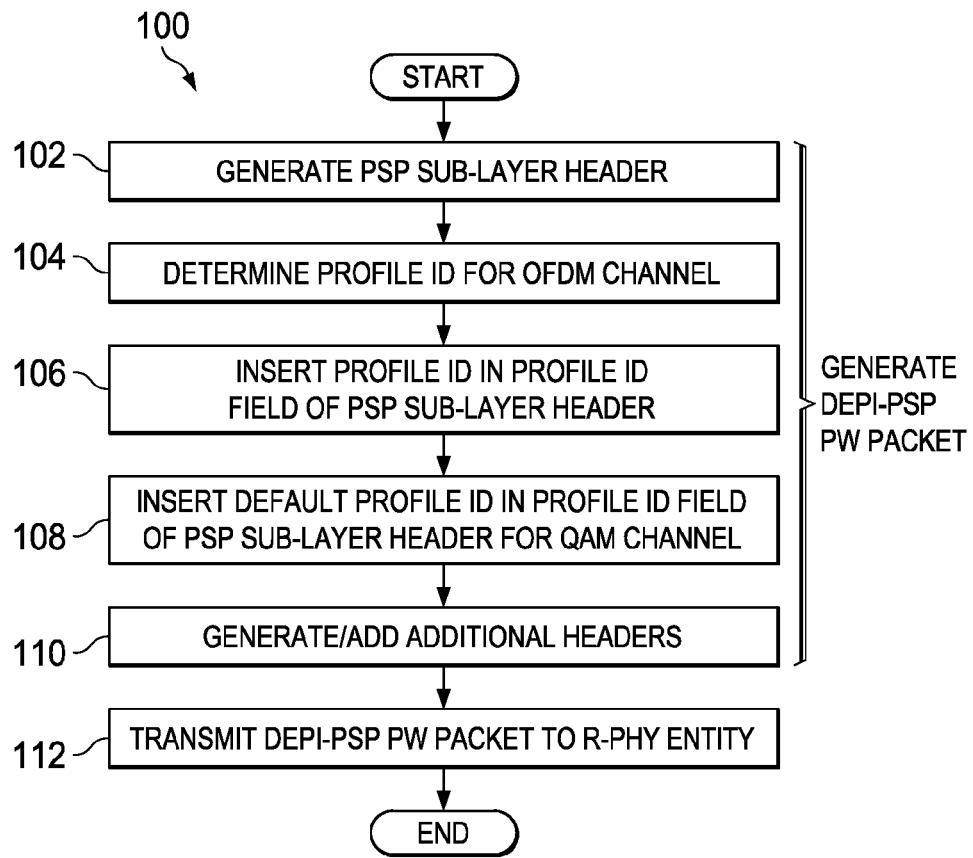
FIG. 5 is a simplified flow diagram illustrating example operations that may be associated with an embodiment of the communication system.

Turning to FIG. 5, FIG. 5 is a simplified flow diagram illustrating example operations 100 that may be associated with an embodiment of communication system 10. At 102, PSP module 26 may generate PSP sub-layer header 30. At 104, PSP module 26 may determine the value of profile ID 38 for the OFDM channel. The value of profile ID 38 may be passed to PSP module 26 from a higher level function in MAC 18 (e.g., DOCSIS MAC). At 106, PSP module 26 may insert the value determined at 104 in profile ID 38. At 104, for the QAM channel, the inserted value may be a dummy or default value, such as '0000.' At 110, PSP module 26 may generate additional headers (e.g., Ethernet header, L2TPv3, etc.). Note that operations 102-110 may involve generating DEPI-PSP PW packet 24. At 112, CCAP Core 12 may transmit generated DEPI-PSP PW packet 24 to R-PHY entity 14 over DEPI 16.

Figure 6:
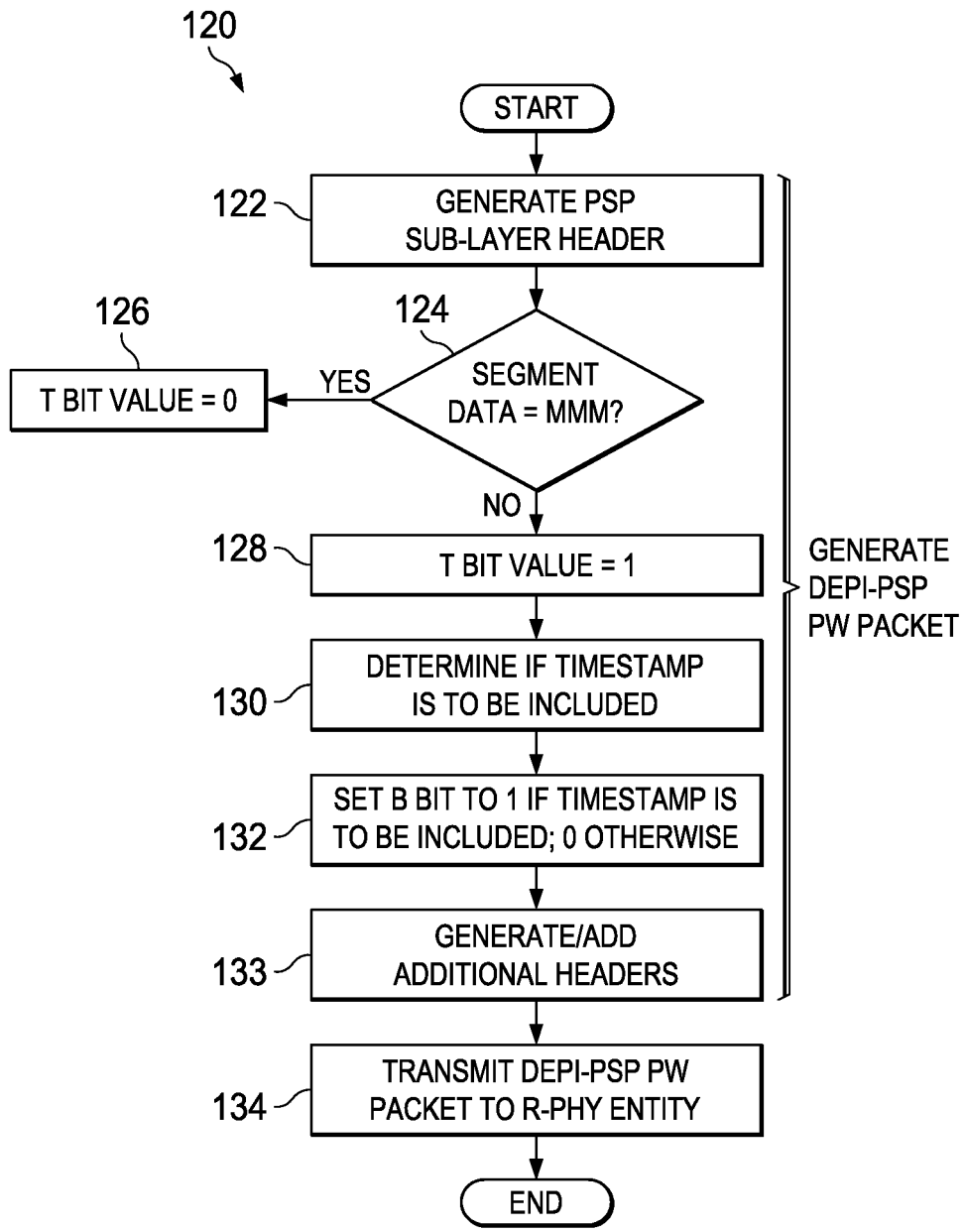
FIG. 6 is a simplified flow diagram illustrating other example operations that may be associated with an embodiment of the communication system.

Turning to FIG. 6, FIG. 6 is a simplified flow diagram illustrating example operations 120 that may be associated with an embodiment of communication system 10. At 122, PSP module 26 may generate PSP sub-layer header 30. At 124, PSP module 26 may determine if segment data in segment 44 comprises MMM. If so, at 126, a value of 0 may be assigned to T bit 42. If segment data in segment 44 does not comprise MMM (e.g., segment data comprises PLC MBs, at 128, a value of 1 may be assigned to T bit 42. Further, at 130, the segment data in PSP module 26 may determine if timestamp 50 is to be included in PSP sub-layer header 30 for the PLC MB. The determination may be based on instructions and/or values passed onto PSP module 26 from at least one higher level function in MAC 18. At 132, the value of B bit 46 may be set to 1 if timestamp 50 is to be included; otherwise the value of B bit 46 may be set to 0. At 133, PSP module 26 may generate additional headers (e.g., Ethernet header, L2TPv3, etc.). Note that operations 122-133 may involve generating DEPI-PSP PW packet 24. At 134, CCAP Core 12 may transmit generated DEPI-PSP PW packet 24 to R-PHY entity 14 over DEPI 16.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, R-PHY entity 14 and/or CCAP Core 12. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, R-PHY entity 14 and/or CCAP Core 12 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 56) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 64, PSP module 26) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
generating, at a Converged Cable Access Platform (CCAP) Core, a Downstream External Physical Interface (DEPI)-Packet Streaming Protocol (PSP) pseudowire (PW) packet comprising a PSP sub-layer header having a same length for a Quadrature Amplitude Modulation (QAM) channel and an Orthogonal Frequency-Division Multiplexing (OFDM) channel in a Data Over Cable Service Interface Specification (DOCSIS) network environment, wherein the PSP sub-layer header includes a profile identifier (ID) corresponding to a particular profile for the OFDM channel; and
transmitting the DEPI-PSP PW packet over a DEPI interface to a remote physical layer (R-PHY) entity.

2. The method of claim 1, wherein the profile ID is ignored by the R-PHY entity for the QAM channel.

3. The method of claim 1, wherein the profile ID comprises four bits.

4. The method of claim 1, wherein the PSP sub-layer header includes a segment type bit indicative of a type of data in a segment portion of the DEPI-PSP PW packet.

5. The method of claim 4, wherein the type of data comprises a Media Access Control (MAC) management message (MMM) or a PLC Message Block.

6. The method of claim 5, wherein a value of 1 for the type bit indicates MMM in the segment portion of the DEPI-PSP PW packet, wherein a value of 0 for the type bit indicates PLC Message Block for the segment portion of the DEPI-PSP PW packet.

7. The method of claim 5, wherein the PSP sub-layer header further includes a B bit indicative of a timestamp representing a future time for transmitting information in the DEPI-PSP PW packet by the R-PHY entity to a cable modem.

8. The method of claim 7, wherein the timestamp is included if a type bit value indicates a PLC Message Block and a B bit value indicates presence of the timestamp.

9. Non-transitory tangible computer readable media that includes instructions for execution, which when executed by a processor, performs operations comprising:
generating, at a CCAP Core, a DEPI-PSP PW packet comprising a PSP sub-layer header having a same length for a QAM channel and an OFDM channel in a DOCSIS network environment, wherein the PSP sub-layer header includes a profile identifier (ID) corresponding to a particular profile for the OFDM channel; and
transmitting the DEPI-PSP PW packet over a DEPI interface to a R-PHY entity.

10. The media of claim 9, wherein the PSP sub-layer header includes a segment type bit indicative of a type of data in a segment portion of the DEPI-PSP PW packet.

11. The media of claim 10, wherein the PSP sub-layer header further includes a B bit indicative of a timestamp representing a future time for transmitting information in the DEPI-PSP PW packet by the R-PHY entity to a cable modem.

12. An apparatus, comprising:
a CCAP Core;
a memory element for storing data; and
a processor, wherein the processor executes instructions associated with the data, wherein the processor and the memory element cooperate, such that the apparatus is configured for:
generating, at the CCAP Core, a DEPI-PSP PW packet comprising a PSP sub-layer header having a same length for a QAM channel and an OFDM channel in a DOCSIS network environment, wherein the PSP sub-layer header includes a profile identifier (ID) corresponding to a particular profile for the OFDM channel; and
transmitting the DEPI-PSP PW packet over a DEPI interface to a R-PHY entity.

13. The apparatus of claim 12, wherein the PSP sub-layer header includes a segment type bit indicative of a type of data in a segment portion of the DEPI-PSP PW packet.

14. The apparatus of claim 13, wherein the PSP sub-layer header further includes a B bit indicative of a timestamp representing a future time for transmitting information in the DEPI-PSP PW packet by the R-PHY entity to a cable modem.

* * * * *